(No Model.)
H. D. NICHOLS.
MOLE TRAP.
No. 524,346. Patented Aug. 14, 1894.
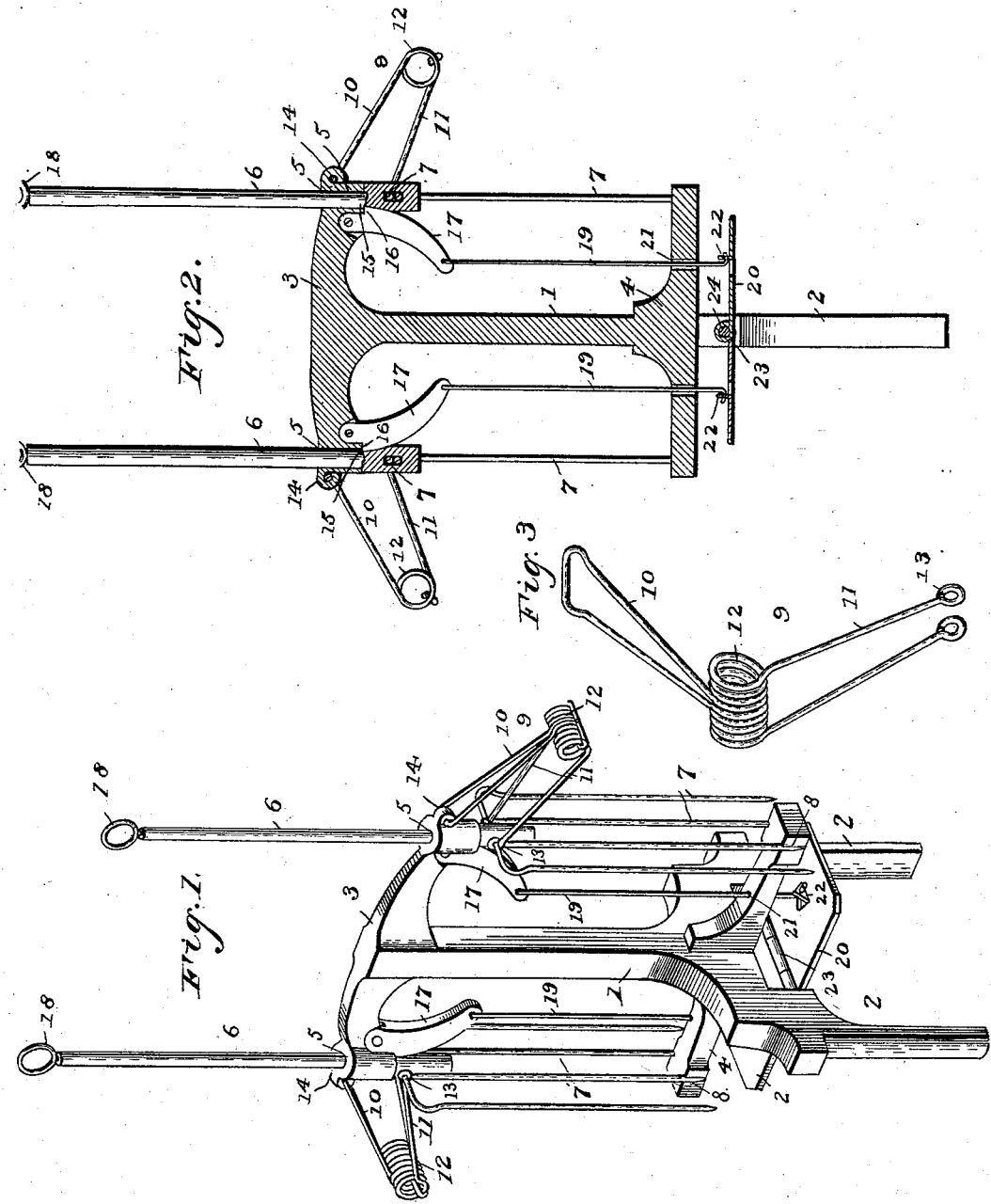
Inventor
Herschel D. Nichols,
By his Attorneys.
C. A. Snow & Co.
Witnesses
Julius Ulke, Jr.
H. F. Ray

UNITED STATES PATENT OFFICE.

HERSCHEL D. NICHOLS, OF COLDWATER, MICHIGAN.

MOLE-TRAP.

SPECIFICATION forming part of Letters Patent No. 524,346, dated August 14, 1894.

Application filed April 12, 1894. Serial No. 507,295. (No model.)

*To all whom it may concern:*

Be it known that I, HERSCHEL D. NICHOLS, a citizen of the United States, residing at Coldwater, in the township of Algansee and State of Michigan, have invented a new and useful Mole-Trap, of which the following is a specification.

The invention relates to improvements in mole traps.
The object of the present invention is to improve the construction of mole traps, to increase their capacity, and to provide a simple, inexpensive and sensitive one capable of being readily set.
The invention consists in the construction and novel combination and arrangement of parts hereinafter fully described, illustrated in the accompanying drawings, and pointed out in the claims hereto appended.
In the drawings: Figure 1 is a perspective view of a mole trap constructed in accordance with this invention, one side being set and the other side being sprung. Fig. 2 is a longitudinal sectional view of the same. Fig. 3 is a detail perspective view of one of the springs.

Similar numerals of reference indicate corresponding parts in the several figures of the drawings.

1 designates a standard, having a forked lower portion comprising opposite legs 2, adapted to be inserted in the ground at opposite sides of a mole run which is straddled by them. The standard is provided, above the legs, with upper and lower horizontal guide-arms 3 and 4, arranged in pairs and projecting from opposite sides of the standard and extending in the direction of the mole run. The outer ends of the upper guide-arms are provided with vertical eyes or openings 5, in which are arranged vertically-movable plungers 6, carrying, at their lower ends, depending tines 7, guided by the lower arms 4 and adapted when the trap is sprung to impale a mole. The tines are preferably four in number, but any other desired number may be employed, and the inner tines are arranged in opposite notches 8, of the lower guide-arms 4, and are thereby guided in their vertical movement.
The plungers are each forced downward by a spring 9, constructed of a single piece of resilient wire and composed of upper and lower parallel arms 10 and 11 and intermediate connecting coils 12. The spring is formed by first doubling the wire to form the upper arms; the wire is then coiled; and is extended downward below the coils to form the lower arms, which terminate in eyes 13 which embrace the connecting portion of the outer tines and is thereby connected with the plunger at the lower end thereof. The upper arms are attached to the adjacent guide-arm 3, adjacent to a lug 14, thereof which is bent around it; but any other suitable means may be provided for effecting this attachment. These springs perform a double function, they force the plungers downward sufficient to drive the tines into an animal, and they also cushion the plungers at the end of their downward movement.

Each plunger is provided, near its lower end, with a shoulder 15, adapted to be engaged by a shoulder 16, of a setting lever 17, fulcrumed at its upper end on the companion guide-arm 3, adjacent to the eye 5 thereof, and curving downward and inward, whereby it forms a gravity latch adapted to engage automatically with the plunger when the latter is raised. The upper end of the plunger is provided with a finger-loop 18, to facilitate raising it.

The lower end of the setting lever 17 is connected by a rod 19 with one of a pair of hinged triggers or plates 20; each connecting rod has its upper end attached to the lower end of its companion setting lever, and it passes through an opening 21 of the lower guide-arm 4, and is hooked into a perforated tongue 22, of its companion trigger-plate.

The trigger-plates are located directly beneath the lower guide-arms 4, they are provided at their inner adjacent ends with knuckles 23, and are hinged in the crotch of the legs by a pintle 24.

The trap is set over a mole run, as will be readily understood; and an animal in attempting to pass through the run lifts the adjacent trigger-plate and springs that side of the trap; and by providing a double trap, two animals may be caught before resetting the trap.

It will be seen that an exceedingly simple and sensitive trap is provided, that it is adapted to be readily arranged over a mole run, and that it is capable of being readily set.

Changes in the form, proportion, and the minor details of construction may be resorted to without departing from the principle or sacrificing any of the advantages of this invention.

What I claim is—

1. In a mole trap, the combination of a standard provided with opposite legs and having above the legs upper and lower horizontally disposed guide arms extending from opposite sides of the standard, the upper guide arms being provided with eyes and the lower guide arms having oppositely disposed notches, plungers provided at their inner sides with shoulders, the tines depending from the plungers and located at opposite sides of the lower guide arms and fitting in the notches thereof, springs for actuating the plungers, the inward extending setting levers pivoted at their upper ends to the upper guide arms and provided at their outer sides with shoulders to engage those of the plungers and arranged to swing outward, and the hinged trigger plates connected with the setting levers and swinging the same outward in engagement with the plungers, substantially as described.

2. In a mole trap, the combination of a standard provided with upper and lower guide-arms, a plunger mounted on and guided by said arms, and provided with depending tines, a spring constructed of a single piece of resilient wire and composed of upper arms attached to the upper guide-arm, a pair of lower arms connected with the plunger at opposite sides thereof and the intermediate coils connecting the upper and lower arms of the spring, said spring being adapted to force the plunger downward and to cushion the same, and means for setting and springing the trap, substantially as described.

3. In a mole trap, the combination of a standard, upper horizontal arms extending from opposite sides thereof and provided with vertical eyes, lower horizontal arms, vertically-movable plungers arranged in said eyes and provided with depending tines guided by the lower arms, said plungers being provided with shoulders, springs composed of upper and lower arms and intermediate coils, the upper arms of the springs being connected to the upper guide-arms and the lower spring-arms being attached to the plungers, depending setting levers fulcrumed on the upper guide-arms and arranged adjacent to the eyes and having shoulders to engage those of the plungers, trigger-plates arranged below the lower guide-arms and provided at their inner adjacent ends with knuckles, a pintle-rod arranged in the knuckles, and connecting rods extending from the trigger-plates to the setting levers, substantially as described.

In testimony that I claim the foregoing as my own I have hereto affixed my signature in the presence of two witnesses.

HERSCHEL D. NICHOLS.

Witnesses:
C. G. BABCOCK,
JOHN A. GREENAMYER.